Patented Apr. 8, 1930

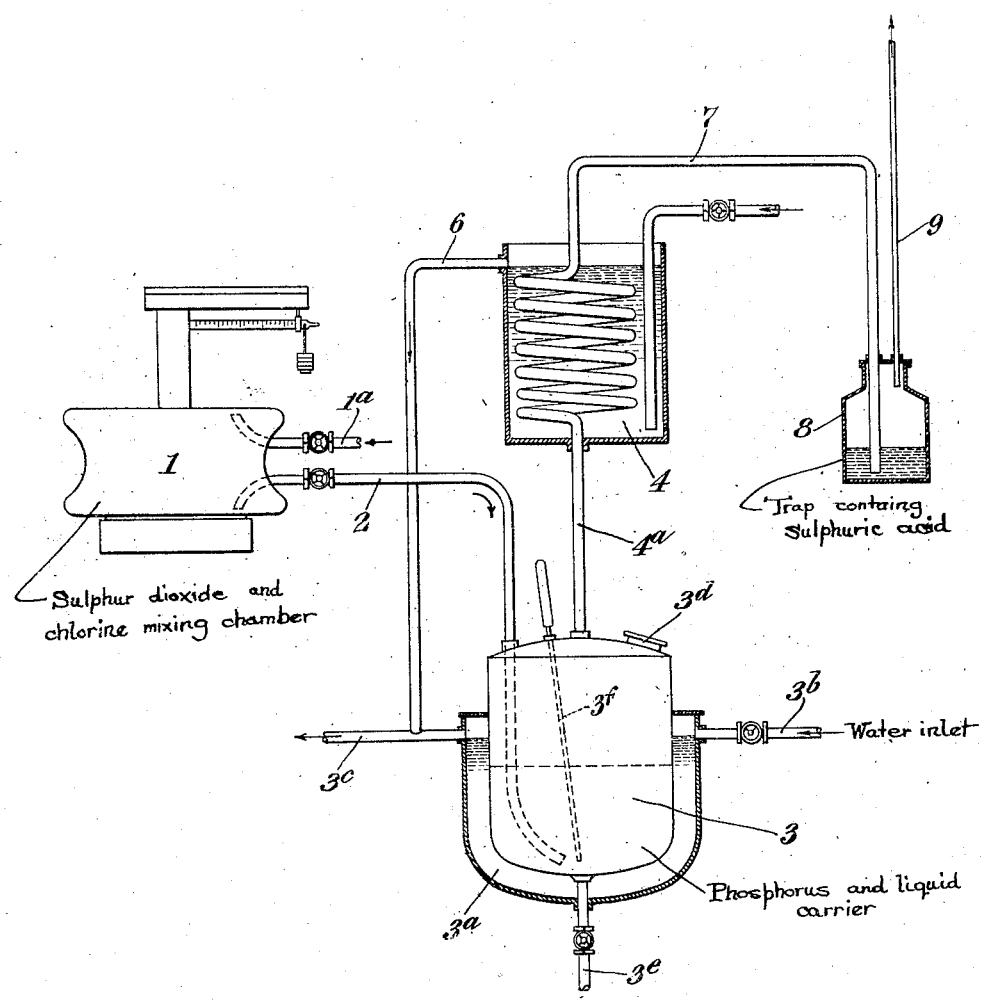

1,753,754

UNITED STATES PATENT OFFICE

GEORGE J. SCHUDEL, OF NITRO, WEST VIRGINIA, ASSIGNOR, BY MESNE ASSIGNMENTS, TO ELKO CHEMICAL COMPANY, A CORPORATION OF WEST VIRGINIA

MANUFACTURE OF PHOSPHORUS OXYCHLORIDE AND THIONYL CHLORIDE

Application filed November 18, 1926. Serial No. 149,063.

My invention relates particularly to a process of making phosphorus oxychloride and thionyl chloride, and has relation especially to the manufacture thereof with the aid of chlorine and sulphur dioxide.

Both phosphorus oxychloride and thionyl chloride are becoming of increased importance as the demand for and use of the same is steadily increasing. For example, phosphorus oxychloride is being used extensively as a condensing agent in a large number of chemical reactions and the esters of the same with phenols, cresols, etc., are used widely as plasticizers and camphor substitutes.

Many methods have been suggested for the manufacture of phosphorus oxychloride, as, for example, the oxidation of phosphorus trichloride with potassium chlorate (Jour. f. pr. Chemie, 1883, (2) vol. 23, p. 283); the reaction between pentachloride and water (G. Oddo, G. 25, II, p. 330); by passing chlorine over heated calcium metaphosphate and coal (German Patent 138,392); the reaction of phosgene upon calcium phosphate (U. S. Patent 1,424,193); by passing sulphur dioxide gas over phosphorus pentachloride (Annalen 102; 111, 1857); the reaction of sulphuryl chloride with phosphorus trichloride (German Patent 415,312). Also it has been proposed to make thionyl chloride by the action of sulphur dioxide gas on phosphorus pentachloride (Schiff, Annalen, 102, page 111, 1857), which, however, gives only 50% of the theoretical quantity (Vanino, Praep. Chemie, I, p. 94); or the action of sulphuryl chloride on phosphorus trichloride (German Patent 415,312); the interaction of sulphur trioxide, sulphur chloride and chlorine (German Patent 139,455); the reaction between sulphuryl chloride and carbon monoxide, or phosgene and sulphur dioxide (German Patent 284,935).

All of these previous processes for producing these two compounds are, however, complicated and expensive. For example, phosphorus pentachloride is expensive and its interaction with sulphur dioxide is slow and produces, furthermore, a poor yield. The products obtained from phosphorus trichloride and sulphuryl chloride are difficult to separate in view of the boiling points, the boiling point of sulphuryl chloride being 68–69° C., phosphorus trichloride 74° C., thionyl chloride 78–79° C., and phosphorus oxychloride 107° C.

I have found that when chlorine and sulphur dioxide are mixed together, as hereinafter referred to in carrying out the desired reaction, and used simultaneously either as a mixture of gases or as liquefied gases, that this mixture reacts with phosphorus in its elemental form (either red or yellow) or with phosphorus trichloride according to the following reactions:

(1). $P + SO_2 + 5Cl = POCl_3 + SOCl_2$.
(2). $PCl_3 + SO_2 + 2Cl = POCl_3 + SOCl_2$.

These reactions are instantaneous and quantitative and avoid the disadvantages of other processes. The result could not have been foreseen as it would have been expected that all of the phosphorus would react first to form phosphorus trichloride and then phosphorus pentachloride before any reaction would take place with sulphur dioxide. In carrying out my invention I have found that the phosphorus or phosphorus trichloride could be present in any desired excess when using sulphur dioxide and chlorine in the proper ratio, the only products obtained being phosphorus oxychloride and thionyl chloride. The rate of the reaction is controlled by the amount of external cooling applied, and the reaction may be carried out in an open container unless it is conducted at a temperature above the boiling point of thionyl chloride, in which case a reflux condenser may be attached, or the thionyl chloride may be distilled off as formed.

My prior application upon Liquefied gases and process of using the same, executed on the 29th day of September, 1926, is related generically to the present invention, and is Serial No. 140,427, filed October 8, 1926.

While my invention is capable of embodiment in many different forms, I have described only certain forms of the same in detail herein, and while it is capable of being carried out in many different types of apparatus, I have shown only one type of apparatus for use in connection therewith in the drawings, in which—

The figure is a diagrammatic representation of an apparatus which may be used in accordance with my invention in the instance where a reflux condenser is to be used. It will be understood, however, that, if desired, the reflux condenser may be omitted, as above pointed out.

For example, in carrying out my invention I may introduce 32 pounds of liquid sulphur dioxide into a closed pressure vessel 1 by means of a pipe $1^a$, and thereafter I may introduce 88.75 pounds of liquid chlorine into the same. An outlet pipe 2 is provided from the vessel 1, which discharges into a still 3 below the surface of the liquid therein. The still 3 may have a cooling jacket $3^a$ provided with a current of cooling water by means of inlet and outlet pipes $3^b$ and $3^c$. Said still 3 also has a charging hole $3^d$ and a valved drain pipe $3^e$, as well as a thermometer $3^f$. The liquid in the still 3 is preferably comprised of a liquid carrier such as a solvent or diluent for the phosphorus, such as phosphorus oxychloride or thionyl chloride, or a mixture of both, in order to avoid the introduction of other undesirable compounds. However, a diluent such as carbon tetrachloride, may be used, if desired. For example, I may use 16.5 pounds of red or yellow phosphorus suspended or melted respectively under sufficient of the liquid as, for instance, phosphorus oxychloride, to protect the phosphorus from any air that might be present, that is to say, about 25 pounds of phosphorus oxychloride or more. Or, instead of phosphorus oxychloride the mixture of thionyl chloride and phosphorus oxychloride resulting from a previous operation may be used, that is to say, 25 pounds of the mixture or more. If desired, the liquid sulphur dioxide and chlorine may be allowed to expand prior to entering the still 3 before the reaction, but preferably the mixed liquids which form a solution are introduced directly into the contents of the still 3 in order to utilize the cooling effect of the same. As a result a lively reaction ensues, which is controlled by adjusting the amount of mixed liquid gases fed into the same and the amount of external cooling applied. The end of the reaction may be observed by one or more of the following conditions: a distinct fall in temperature; a change in color of the reaction mixture; and by cessation of the complete absorption of the mixed gases or liquids. In case the above reaction is conducted at a temperature above the boiling point of thionyl chloride the still 3 will have provided thereon a reflux condenser 4 connected to the still 3 by a pipe $4^a$ cooled by a current of water provided by inlet and outlet pipes 5 and 6, which latter is connected to the pipe $3^c$. From the reflux condenser 4 an outlet pipe 7 passes into a trap 8 containing sulphuric acid and having a vent-pipe 9. After the reaction product has, thus, been obtained the components of the reaction mixture may be separated by fractional distillation in an efficient column.

It will be understood that many changes may be made in the proportions of the materials above used, as well as the order in which they are introduced, and the temperatures under which the reactions are conducted, etc. For example, the phosphorus may be wholly or partly replaced by phosphorus trichloride, and the ratio of sulphur dioxide and chlorine changed accordingly.

While I have described my invention above in detail I wish it to be understood that many changes may be made therein without departing from the spirit of the same.

I claim:

1. The process which comprises producing phosphorus oxychloride and thionyl chloride by the reaction of sulphur dioxide and chlorine on phosphorus.

2. The process which comprises producing phosphorus oxychloride and thionyl chloride by the reaction of a mixture of sulphur dioxide and chlorine on phosphorus the sulphur dioxide and chlorine being in the form of a liquid.

3. The process which comprises producing phosphorus oxychloride and thionyl chloride by the reaction of a mixture of sulphur dioxide and chlorine on phosphorus contained in a liquid carrier.

4. The process which comprises producing phosphorus oxychloride and thionyl chloride by the reaction of a mixture of sulphur dioxide and chlorine on phosphorus contained in a liquid carrier, the sulphur dioxide and chlorine being in the form of a liquid.

5. The process which comprises producing phosphorus oxychloride and thionyl chloride by the reaction of a mixture of sulphur dioxide and chlorine on phosphorus contained in a liquid carrier, said liquid carrier being a compound such as formed in the above reaction.

6. The process which comprises producing phosphorus oxychloride and thionyl chloride by the reaction of a mixture of sulphur dioxide and chlorine on phosphorus contained in a liquid carrier, the sulphur dioxide and chlorine being in the form of a liquid, said liquid carrier being a compound such as formed in the above reaction.

7. The process which comprises producing phosphorus oxychloride by the reaction of a mixture of sulphur dioxide and chlorine on phosphorus, the sulphur dioxide and chlorine being in the form of a liquid.

8. The process which comprises producing phosphorus oxychloride by the reaction of a mixture of sulphur dioxide and chlorine on phosphorus contained in a liquid carrier, said liquid carrier being a compound such as formed in the above reaction.

9. The process which comprises producing phosphorus oxychloride by the reaction of a mixture of sulphur dioxide and chlorine on phosphorus contained in a liquid carrier, the sulphur dioxide and chlorine being in the form of a liquid, said liquid carrier being a compound such as formed in the above reaction.

10. The process which comprises producing thionyl chloride by the reaction of sulphur dioxide and chlorine on phosphorus.

11. The process which comprises producing thionyl chloride by the reaction of a mixture of sulphur dioxide and chlorine on phosphorus, the sulphur dioxide and chlorine being in the form of a liquid.

12. The process which comprises producing thionyl chloride by the reaction of a mixture of sulphur dioxide and chlorine on phosphorus contained in a liquid carrier.

13. The process which comprises producing thionyl chloride by the reaction of a mixture of sulphur dioxide and chlorine on phosphorus contained in a liquid carrier, the sulphur dioxide and chlorine being in the form of a liquid.

14. The process which comprises producing thionyl chloride by the reaction of a mixture of sulphur dioxide and chlorine on phosphorus contained in a liquid carrier, said liquid carrier being a compound such as formed in the above reaction.

15. The process which comprises producing thionyl chloride by the reaction of a mixture of sulphur dioxide and chlorine on phosphorus contained in a liquid carrier, the sulphur dioxide and chlorine being in the form of a liquid, said liquid carrier being a compound such as formed in the above reaction.

In testimony that I claim the foregoing, I have hereunto set my hand this 30th day of October, 1926.

GEORGE J. SCHUDEL.